United States Patent

[11] 3,586,818

| [72] | Inventor | Paul V. Blake<br>P. O. Box 4305, London, Ontario, Canada |
|---|---|---|
| [21] | Appl. No. | 840,046 |
| [22] | Filed | July 8, 1969 |
| [45] | Patented | June 22, 1971 |

[54] SPATTER PROTECTING NOZZLE COATING
6 Claims, No Drawings

| [52] | U.S. Cl. | 219/137, 219/75, 219/136 |
|---|---|---|
| [51] | Int. Cl. | B23k 9/00 |
| [50] | Field of Search | 219/137, 130, 75, 74 |

[56] References Cited

UNITED STATES PATENTS

| 2,250,940 | 7/1941 | Zahn et al. | 219/137 |
| 2,343,158 | 2/1944 | Scott | 219/137 X |
| 2,446,922 | 8/1948 | Grundner | 219/137 X |

Primary Examiner—J. V. Truhe
Assistant Examiner—George A. Montanye
Attorney—Cushman, Darby and Cushman ABSTRACT: In the automatic or semiautomatic welding of metals which involves passing an electric arc from a consumable metal electrode in a welding nozzle, a method of protecting said nozzle from spatter during said welding which comprises contacting the nozzle heated to elevated temperature with a hydrocarbon petrolatum grease prior to welding whereby to coat said surfaces with said petrolatum grease.

SPATTER PROTECTING NOZZLE COATING

The present invention relates to electric arc welding of metals including automatic and semiautomatic welding of metals. In particular, the present invention relates to the use of an improved antispatter composition in such arc welding.

In the automatic or semiautomatic electric arc welding of metals in which an electric arc is struck between a consumable metal electrode extending from the nozzle of the welding gun and the workpiece there is the ever present problem of weld problem of weld spatter formed during the welding operation which weld spatter adheres to the inside and outside of the nozzle causing fusion between the electrode and the tip of the nozzle and instability in the arc. The presence of weld spatter adhering to the surfaces of the nozzle is thus substantially detrimental to the welding techniques such that in a very short period of time it is necessary for the operator to cease welding operations and clean the spatter from the nozzle which is a time consuming operation and further, shortens the life of the nozzle and in commercial welding operations cannot be tolerated.

Many attempts have been made to avoid weld spatter adhering to the nozzle all of which have involved treating the nozzle with antispatter composition. However, the known antispatter compositions have disadvantages in their effectiveness, in their mode of application to the nozzle of the welding gun and further tend to emit undesirable fumes and/or odors during the welding process.

Typical of the aforesaid antispatter compositions are silicones which are provided as aerosoles or in the form of liquids. However, although silicones are effective antispatter agents when used in the form of aerosols there is always the danger of the aerosol bombs exploding when accidentally contacted with heat from the welding apparatus and further, particularly in the automotive industry where the welded automobile bodies are subsequently painted in the same plant, the presence of silicones in the atmosphere which silicones are discharged into the air when sprayed onto the nozzles from the aerosol bomb contaminate the paint requiring the automobile bodies to be repainted and refinished in a substantial number of cases. As a consequence many automotive plants will not allow the presence of silicone aerosols in the plant. With liquid silicone it is necessary for the welding operator to dip the nozzle into the liquid when it is cold which necessitates allowing the nozzle to cool after welding and further, the nozzle so dipped has to be allowed to dry to provide a silicone coating thereon before further arc welding may be effected, and of course there is the ever present problem of spillage with a liquid material which again is undesirable.

More importantly, a major drawback of the prior art antispatter compositions is their relatively low effectiveness and in general in practice it is found that on welding with a nozzle treated with the antispatter compositions of the prior art, weld spatter begins to adhere to the nozzle after about 15 to 30 minutes and thus every 15 to 30 minutes it is necessary for the operator to stop the welding operation, allow the nozzle to cool and apply more antispatter composition to the nozzle. Again, silicones are relatively expensive materials.

The present invention provides an antispatter composition which is in the form of a paste compound, is simple to apply to the nozzle of the welding apparatus, protects the nozzle from adherence of the spatter during welding for substantially increased periods of time over the antispatter compositions of the prior art and at least in its preferred embodiment is odorless.

It has now been found according to the present invention that a hydrocarbon petrolatum grease, particularly a white hydrocarbon petrolatum grease, such as that normally sold under the Trade Mark PARMO by Humble Oil, Inc., including PARMO 10, PARMO 12, PARMO 14, PARMO 30, PARMO 60 and PARMO 62 and PARMO 70 and more particularly PARMO 14, which petrolatums are suitably in the form of a gel, is simple to apply to the nozzle merely by dipping the nozzle when still hot into the gel, causing the gel to melt and coat the surfaces of the nozzle and protect the nozzle from adherence of weld spatter for periods of time varying from about 3 to 5 hours.

According to the present invention therefore there is provided in the automatic or semiautomatic welding of metals which involves passing an electric arc from a consumable metal electrode to a welding nozzle, a method of protecting said nozzle from spatter during said welding which comprises contacting the nozzle heated to elevated temperature with a hydrocarbon petrolatum grease before welding whereby to coat said surfaces with said petrolatum grease.

With the petrolatum grease of the present invention the nozzle when hot is dipped into the grease, suitably in the form of a jelly, which melts, coats the surfaces of the nozzle and when the nozzle is removed solidifies thus eliminating waste due to spillage and avoids the operator from having to wait for the nozzle to cool down when the coating needs to be renewed. Further, as opposed to the antispatter compositions of the prior art, the petrolatum grease is simple to apply merely by dipping as opposed to spraying and brushing with aerosols and liquids respectively.

The antispatter compositions used in the process of the present invention are hydrocarbon petrolatum greases which are normally odorless and congeal on heating and cooling to form a jelly. Particularly suitable are the white petrolatum greases (U. S. P. or B. P.) and most preferably, the white petrolatum greases supplied under the Trade Mark PARMO. In a particular embodiment of the present invention the petrolatum grease is that supplied under the Trade Mark PARMO 14 which is usually prepared by filtering crude petrolatum greases and in particular a blend of such greases normally obtained from various oil fields in United States with activated bauxite clays which filtration yields homogeneous materials varying in color from light to dark as the filtration proceeds. The white (or snow) petrolatum greases are first to come from the filtration process and are removed and in the formation of the PARMO 14 are suitably blended with semirefined oil, in particular paraffin oils of about 70 viscosity. These hydrocarbon petrolatum greases are suitably heated to melting point and then allowed to congeal to form a jelly in which form they may be used in the process of the present invention.

It is surprising that the PARMO petrolatum greases which are supplied by Humble Oil, Inc. primarily as unguent bases for cosmetics such as cold cream and for pharmaceutical use such as salves and ointments, have the ability to provide a protective coating for nozzle of electric arc welding guns even under high arc welding temperatures without any significant decomposition to carbon which is detrimental to welding causing porosity in the weld. However, it is found that hydrocarbon petrolatum greases, particularly the white hydrocarbon petrolatum greases and preferably the PARMO's, have high thermal stability and when coated onto the surface of the nozzle appear to enter the surface of the metal providing sufficient lubricity to inhibit the adherence of weld spatter of said surfaces. Further, it will be readily seen that renewing the coating of the antispatter composition in the process of the present invention merely requires the operator to switch off the arc, dip the nozzle directly into the gel, withdraw it and switch on the arc which can be done swiftly causing no substantial stoppage in the welding operation. Again, the renewal is only necessary after extended periods of time and the life of the nozzle is also increased when compared with the antispatter compositions of the prior art. Yet again, it will be readily seen that as the composition of the present invention does not include silicone, the expense and further the disadvantageous effects of silicones on paint in automotive plants are avoided.

It is further found that the presence of about 1—6 percent of a wetting agent, in particular that supplied under the Trade Mark REXOL 25J which is ethoxylated nonyl phenol and ethylene oxide and which has a high dispersability, into the petrolatum grease is advantageous in that it provides inter alia a sheen to the coating on the nozzle such that the operator can readily determine when to renew the coating by the disappearance of the sheen on the nozzle. Further, the wetting agent aids in the coating of the surfaces of the nozzle with the petrolatum grease.

In a typical embodiment of the present invention the antispatter composition is suitably prepared by heating the petrolatum grease e.g. the PARMO 14 in a vat to about 190° F., maintaining the temperature at 190° F. for about 30 minutes, adding the wetting agent i.e. the REXOL 25J, in an amount of about 3 percent by volume blending for 20 minutes, cooling to 160° F., adding an oil soluble color code in amount of about 7 percent by volume, blending for 30 minutes at a shear mixing value of about 1400 r.p.m. raising the temperature to 180° F., pouring off and allowing to cool at 78 + F. and solidify for 25 hours. The congealing point of the gel so produced is about 115° F. The present invention will be further illustrated by way of the following example.

EXAMPLE

An antispatter composition was made by heating 49.5 lbs. of white hydrocarbon petrolatum supplied under the Trade Mark PARMO 14, having a Saybolt melting point of 127° F. with 0.25 lbs. of a wetting agent supplied under the Trade Mark REXOL 25J and 0.25 lbs. of an oil soluble powder dye and this mixture was blended and held at 180° F. for 1½ hours and then poured into a container to cool at room temperature for 12 hours.

A thin film of this antispatter composition was applied to the inside and outside of a gun nozzle and a welding tip of a 500 ampere semiautomatic welding machine set at 24 volts, using one-eighth inch diameter electrode automatic wire in a steel fabrication plant. The composition was applied by dipping the nozzle when hot using the heat generated from making a 1 ½ inches to 2 inches long bead of weld metal, the nozzle being dipped three-fourths to 1 inch into the composition whereby the correct amount of the antispatter composition is melted onto the outside and inside of the gun nozzle and any excess amount of the antispatter composition drips back into the container and resolidifies. When welding with the automatic welding machine having the nozzles so coated with the antispatter composition it was found that the adherence of the weld spatter particles to the gun nozzled surface and the building up and clogging of the inside of the welding gun nozzle was prevented for a period on average of from 3 to 5 hours in contrast to the prior art compositions which under similar conditions only protected the nozzles for a period of 15 to 30 minutes before renewal of the coating was required.

I claim:

1. In the automatic or semiautomatic welding of metals which involves passing an electric arc from a consumable metal electrode in a welding nozzle, a method of protecting said nozzle from spatter during said welding which comprises contacting the nozzle heated to elevated temperature with a hydrocarbon petrolatum grease prior to welding whereby to coat said surfaces with said petrolatum grease.

2. A method as claimed in claim 1 in which the petrolatum grease is a white hydrocarbon petrolatum grease.

3. A method as claimed in claim 1 in which the petrolatum grease is a white petrolatum grease blended with semirefined oil, in which the semirefined oil is paraffin oils having a viscosity of about 70.

4. A method as claimed in claim 1 in which the petrolatum contains 1 percent to 6 percent by weight of a petrolatum dispersible wetting agent.

5. A method as claimed in claim 1 in which the grease is in the form of a jelly.

6. A method as claimed in claim 1 in which the nozzle is dipped into the grease.